United States Patent [19]

Thorngren

[11] Patent Number: 5,196,729
[45] Date of Patent: Mar. 23, 1993

[54] LIQUID ACTIVATED CONTROL SWITCH

[76] Inventor: John T. Thorngren, 5947 Williamstown, Dallas, Tex. 75230

[21] Appl. No.: 503,467

[22] Filed: Mar. 30, 1990

[51] Int. Cl.$^5$ .............................. H01H 35/18
[52] U.S. Cl. ..................... 307/118; 62/228.1; 307/632; 340/620
[58] Field of Search .............. 307/632, 308, 116, 118; 361/170, 178–181; 340/620; 324/444; 62/228.1; 137/392

[56] References Cited

U.S. PATENT DOCUMENTS

| | | | |
|---|---|---|---|
| 3,461,131 | 12/1968 | MacKenzie et al. | 340/620 |
| 3,614,542 | 10/1971 | Coyle | 361/178 |
| 3,739,198 | 6/1973 | Clements | 307/632 |
| 3,761,912 | 9/1973 | Stettner et al. | 307/632 X |
| 3,932,852 | 1/1976 | Hill | 340/620 |
| 4,107,658 | 8/1978 | Hill et al. | 340/620 |
| 4,213,061 | 7/1980 | Conner | 307/116 |
| 4,224,606 | 9/1980 | Bartles | 340/514 |
| 4,259,982 | 4/1981 | Bartels | 137/392 |
| 4,360,737 | 11/1982 | Leopold | 302/116 |
| 4,518,316 | 5/1985 | Yokota | 417/12 |
| 4,547,768 | 10/1985 | Kulhavy | 340/620 |
| 4,600,844 | 7/1986 | Atkins | 307/118 |

Primary Examiner—A. D. Pellinen
Assistant Examiner—David Osborn
Attorney, Agent, or Firm—Johnson & Gibbs

[57] ABSTRACT

A liquid activated control switch for detecting the presence of an excessive accumulation of low ionic strength liquids in an air refrigeration system and for controlling the operation of the air refrigeration system based upon the detection of the accumulated liquid which includes first and second liquid detection probes. When the liquid detection probes detect an excessive accumulation of liquid, the air refrigeration system is disconnected. After the excessive accumulation of liquid has been removed, the air refrigeration system remains disconnected until the switch is reset. Alternative embodiments of the liquid activated control switch prevent sloshing liquid in the vicinity of the probes from rapidly turning the switch on and off, by providing varying degrees of sensitivity to accumulated liquid. Time delays are provided in turning off the air refrigeration system when liquid is detected by the probes, and in turning on the system when liquid is no longer detected.

39 Claims, 4 Drawing Sheets

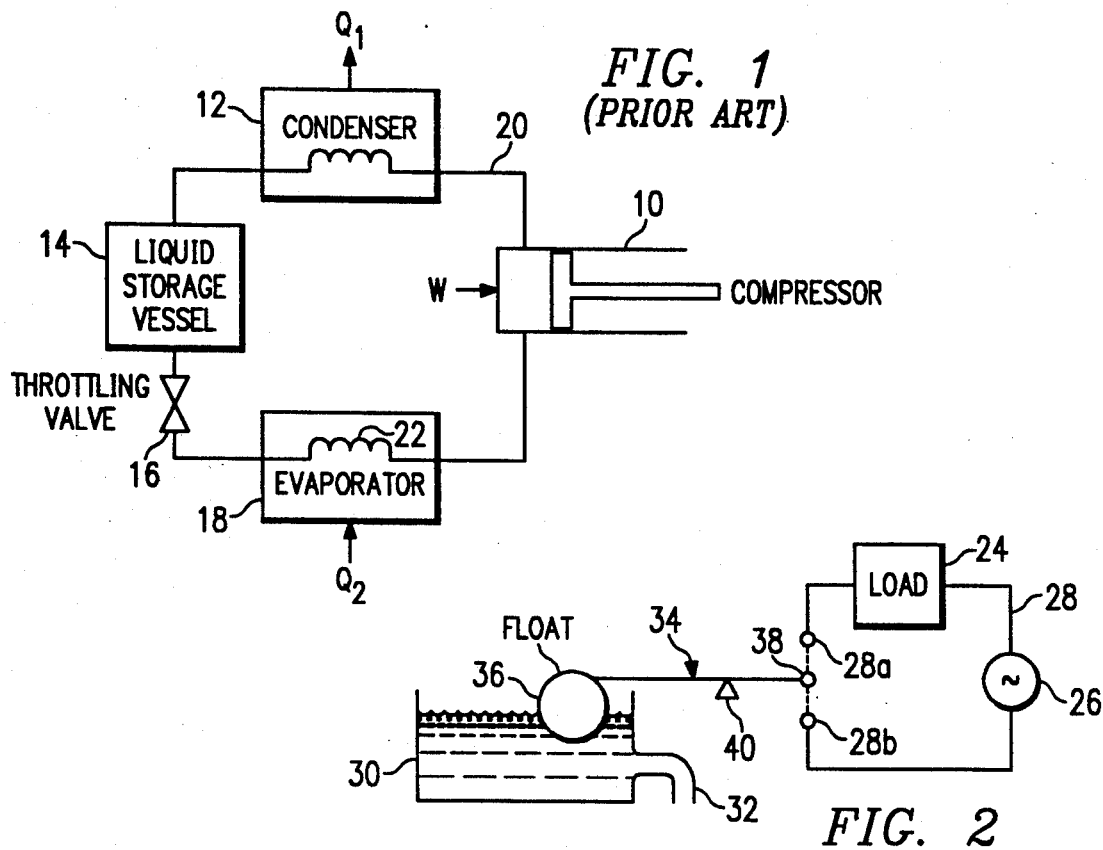
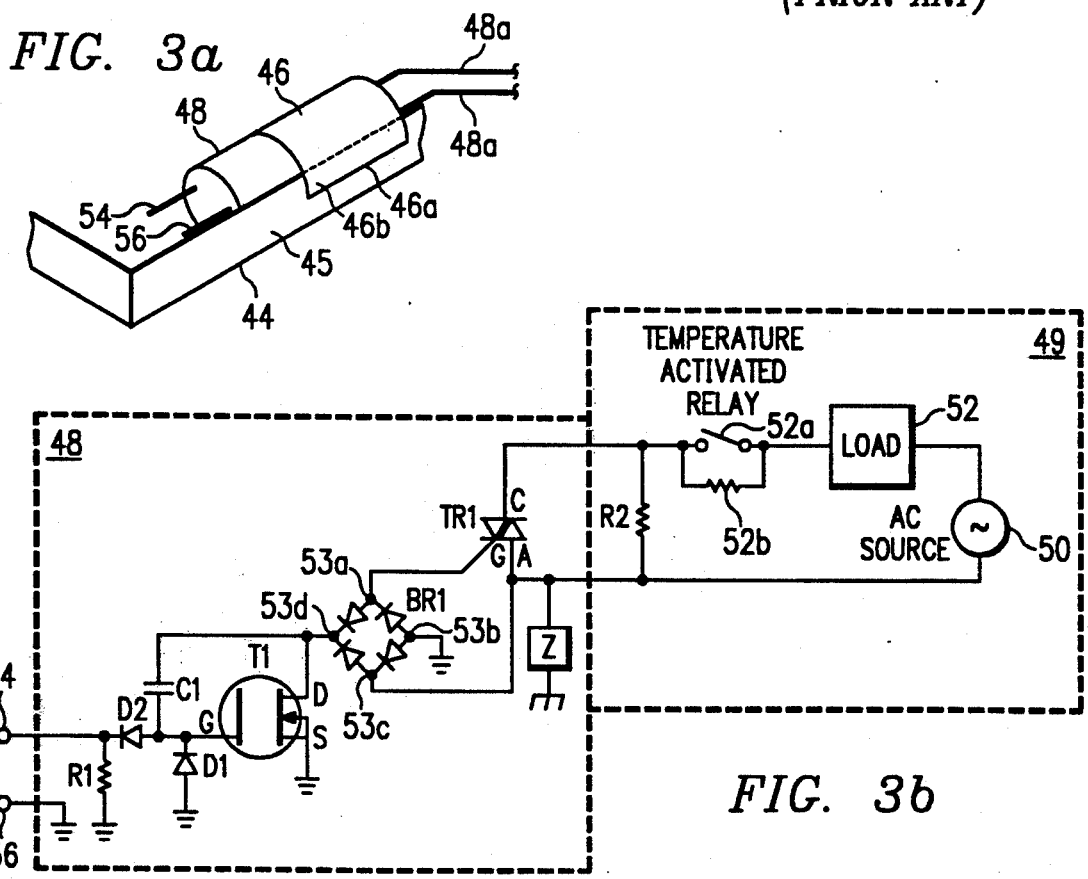

LIQUID ACTIVATED CONTROL SWITCH

BACKGROUND OF THE INVENTION

1. Field of the Invention

This invention is related to a control switch and, more specifically, to a control switch which detects the accumulation of moisture and controls the operation of an associated system based upon the detected accumulation of moisture.

2. Description of Related Art

Referring first to FIG. 1, a typical refrigerator consists of a compressor 10, a condenser 12, a storage tank 14, a throttling valve 16, and evaporator 18 connected by suitable conduits 20 with intake and outlet valves (not shown). The refrigerant stored in the storage tank 14 is a liquid which partly vaporizes and cools as it passes through the throttling valve 16. Among the common refrigerants are ammonia, sulphur dioxide and various halides of methane and ethane. Nearly constant pressures are maintained on either side of the throttling valve 16 by means of the compressor 10. The mixed liquid and vapor entering the evaporator 18 is colder than the near-surround. Thus, the mixed liquid and vapor absorbs heat from the interior of the refrigerator box or cold room and completely vaporizes. The vapor is then forced into the compressor 10, where its temperature and pressure increased as a result of the compression. The compressed vapor then pours into the condenser 12, where it cools down and liquifies as the heat is transferred to outside air, water, or other fluid medium in the condenser cooling coils 12.

In such air refrigeration systems, the evaporator 18 often lowers the air temperature below the dew point. As a result, moisture will condense on the evaporator coil 22. For this reason, air refrigeration systems are also provided with a condensate pan for collecting moisture condensed on the evaporator coil 22. The moisture collected by the condensate pan is then removed by an overflow line. However, dust and other airborne debris may accumulate in the condensate pan and eventually plug the overflow line. In other circumstances, a sewer line to which the overflow line is typically connected may become plugged due to causes unrelated to the air refrigeration system itself. In any event, whenever the condensate pan is prevented from draining, the level of condensate in the pan will steadily increase until the pan overflows, thereby causing water damage to the air refrigeration system.

One solution to this problem was to build a secondary overflow pan connected to a separate overflow line beneath the primary overflow pan. When the overflow line of the primary overflow pan became plugged, condensate would collect in the primary pan until filled. The overflow would then spill over into the secondary overflow pan and drain by way of the overflow line of the secondary overflow pan. While such secondary overflow drainage systems made condensate overflows less likely, they offered no protection from overflows if both drainage systems were blocked. As a result, overflow protection systems often include a switching system to turn the air refrigeration system off in the presence of condensate overflow conditions.

Referring next to FIG. 2, a float activated switching system for an air refrigeration system may now be seen. The air refrigeration system in FIG. 2 consists of a load 24, which may include the air refrigeration system of FIG. 1 connected to a relay via a thermostat of conventional design, connected in series to a low voltage AC source such as a 24 volt AC transformer using electrical connectors 28. The overflow paN 30, which may either be a primary overflow pan or a secondary overflow pan, collects condensating liquid which drains via the overflow line 32. A float actuated switch 34 includes a float 36 positioned in the overflow pan 30 and an electrical contact 38 balanced by a pivot or fulcrum 40. When the level of condensate in overflow pan 30 is low, the contact 38 is engaged with the contacts 28a and 28b of the air refrigeration system 24, thereby permitting power to flow through the load 24, thus maintaining the air refrigeration system 24 in an ON condition. In the event that the overflow line 32 becomes plugged, condensate will begin to accumulate in the overflow pan 30, raising the level of the float 36. When the float 36 has been raised a specified height, the contact 38 will disengage from the contacts 28a and 28b, thereby disconnecting the load 24 from the AC source 26 and turning the air refrigeration system OFF. Unfortunately, due to space limitations during the construction of air refrigeration systems, float actuated switches such as the one described herein are often too large to attach to an overflow pan positioned within the cooling coil housing. In addition, air currents within the cooling coil housing could easily displace the float, thereby resulting in erroneous switching. Finally, float activated switches are particularly undesirable when liquid is draining at a rate just slightly less than the rate at which condensate is being collected by the overflow plan. For example, the overflow line may be partially plugged such that drainage of the accumulated condensate from the overflow pan is occurring at a slightly below normal rate while condensate continues to accumulate at a normal rate. Under these circumstances, the switch could rapidly oscillate between the ON and OFF states, a condition which may result in damage to the air conditioning system.

SUMMARY OF THE INVENTION

It is an object of this invention to provide a control switch capable of readily detecting the presence of liquids of low ionic strength such as the condensate produced by an air refrigeration system, as well as other low ionic liquids such as commercially available distilled water, rain water and certain other organic solutions.

It is an object of this invention to provide a control switch which disconnects an associated electrical system upon the detection of excessive liquid accumulation at a specified location.

It is another object of this invention to provide a normally ON control switch for an associated electrical system which, upon the detection of excessive liquid accumulation, will lock into an OFF state, thereby disconnecting the associated electrical system, and will remain in the OFF state after the excessive liquid accumulation has been removed.

It is yet another object of this invention to provide a normally ON control switch for an associated electrical system which, upon the detection of excessive liquid accumulation, will lock into an OFF state, thereby disconnecting the associated electrical system, and will remain in the OFF state for a specified time period after the excessive liquid accumulation has been removed excessive liquid accumulation.

It is still yet another object of this invention to provide a normally OFF control switch for an associated electrical system which, upon the detection of excessive liquid accumulation, will lock into an ON state, thereby connecting the associated electrical system, and will remain in the ON state after the excessive liquid accumulation has been removed.

BRIEF DESCRIPTION OF THE DRAWINGS

The invention will be better understood and its numerous objects and advantages will become apparent to those skilled in the art by reference to the following drawings in which:

FIG. 1 is a block diagram of an air refrigerator system;

FIG. 2 is a schematic of a float control switch for an air refrigeration system;

FIG. 3a is a perspective view of a control switch for detecting the accumulation of moisture and controlling the operation of an associated air refrigeration system based upon the detected accumulation of moisture which is constructed in accordance with the teachings of the present invention;

FIG. 3b is a schematic diagram of the control switch which switches into the locked OFF position when liquid detection probes associated therewith contact water of FIG. 3a;

DETAILED DESCRIPTION OF THE INVENTION

Figure 4A:
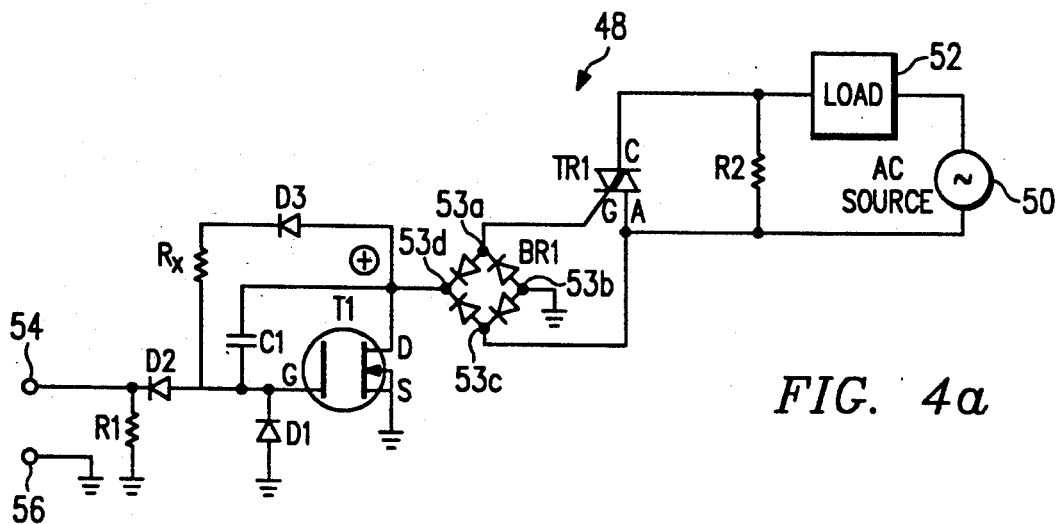
FIG. 4a is a schematic diagram of a second embodiment of the control switch of FIGS. 3a-b which switches into the OFF position when liquid detection probes associated therewith contact water and which resets after a time delay.

For purposes of the discussion to follow, it should be clearly understood that a control switch is "OFF" whenever current flows through the control switch in an amount insufficient to engage relays included in a load associated therewith and a control switch is "ON" whenever current flows through the control switch in an amount sufficient to engage the relays included in a load associated therewith.

The present invention is directed to a control switch which detects the presence of moisture in the proximity of the location of the control switch and which controls an associated electrical system based upon the detection of moisture by the control system. While the control switch subject of the present invention is described in detail in conjunction with an air refrigeration system, it is contemplated that the control switch is suitable for use with any associated electrical system for which the control of such system based upon the presence of moisture at a location would be desirable.

Referring now to FIG. 3a, a control switch for detecting the accumulation of moisture, controlling the operation of an associated air refrigeration system based upon the detected accumulation of moisture and constructed in accordance with the teachings of the present invention shall now be described in detail. As previously discussed, condensate from the cooling coil of the air refrigeration system will begin to accumulate in an overflow pan 44 if the drain (not shown in FIG. 3a) of the overflow pan 44 is partially or completely clogged. To detect an undesirably high level of accumulated water in the overflow pan 44, a control switch 48 is mounted to a sidewall 45 of the overflow pan 44 by mounting means such as a cylindrical clamp housing 46 surroundingly attached to the control switch 48 and having a slitted sidewall 46a for permitting the outward extension of a first section 46b of the cylindrical clamp housing 46 for receiving the sidewall 45 of the overflow pan 44 between the outwardly extending section 46b and the control switch 48. Preferably, the control switch 48 is mounted along the top of the sidewall 45 such that a pair of liquid detecting probes 54, 56 extend outwardly from the control switch 48 near, but not at, the top of the overflow pan 44. So long as the water accumulating in the overflow pan 44 does not contact the liquid detection probes 54, 56, a condensate overflow condition does not exist and the air refrigeration system associated therewith operates normally. In the event that sufficient water accumulates in the overflow pan 44 such that the water contacts the liquid detecting probes 54, 56, an t overflow condition exists and the control switch 48 will disconnect the associated air refrigeration system in a manner to be more fully described below. The associated system will then remain off, even if the level of water in the overflow pan 44 drops such that the water no longer contacts the liquid detection probes 54, 56, until the control switch 48 is reset.

Referring now to FIG. 3b, the operation of the control switch 48 for controlling an associated electrical system 49 shall now be described in greater detail. The associated electrical system includes an AC source 50, for example, a 24 volt transformer, connected in series with a load 52 and a switch 52a such as a temperature activated relay which is also connected in series with the control switch 48 and the control switch 48 is connected in parallel with a resistor R2. Typically, the load 52 includes electrical equipment such as the air refrigeration system previously described with respect to FIG. 1, a thermostat of conventional design, and one or more relays. The resistor R2 serves a particularly unique function with respect to the temperature activated relay 52a. The value of the resistor R2 is chosen large enough so that when the control switch 48 is OFF, the combined small current through the control switch 48 and through the resistor R2 is insufficient to engage the load relay. In other words, the control switch 48 is still OFF. Typical temperature activated relay utilize a bypass or surge resistor 52b, typically in the order of 4000 ohms. This surge resistor 52b, prevents arcing across the contacts of the temperature activated relay 52a whenever the contacts are engaged or disconnected as called for by the temperature setting. Were the resistor R2 not present, the surge resistor 52b can cause the positive charge at the gate G of the transistor T1 to leak off. Then, when the temperature activated relay 52a calls for the relay(s) to engage, the control switch 48 may not turn ON. Thus, the resistor R2 stabilizes the control switch 48 against this process. It should be further noted that a light bulb could be suitably chosen as to provide the same function as the resistor R2 and would also light up and show when the control switch 48 was OFF.

However, if both the resistor R2 and the load 52 are fixed, decreasing the surge resistor 52b provides the means for reducing current through said electrical system to a level insufficient to turn the electrical system ON. This means for reducing currents will eventually cause the control switch 48 to fail to come ON when desired. Similarly, if the resistor R2 and the bypass resistor 52b are fixed, increasing the load impedance will eventually cause the control switch 48 to fail to come on as well. Finally, if the load 52 and the surge resistor 52b are fixed, increasing the resistor R2 will also eventually cause the control switch 48 to fail to come on. Thus, there is a unique function between the load impedance, the resistor R2 and the surge resistor 52b. Furthermore, certain conditions will aggravate this phenomena, i.e. cause the control switch 48 to fail for a given surge resistor 52b, load and resistor R2 which would otherwise not normally fail. These conditions appear to come from some sort of electrical coupling between the AC source 50, usually a transformer, and the control switch 48 and/or by electrical "noise" in the air, line noise, etc. caused by fluorescent lights, switch gear, etc. If a very slight impedance Z, either resistive, capacitive or inductive, is provided to the circuit as illustrated in FIG. 3b, this problem will be alleviated. Typically, the impedance Z is in the range of one million ohms and is connected from the anode of the triac TR1 to ground where ground is not the control switch ground but true ground such as a metal water pipe.

The control switch 48 includes a three junction, bistable semiconductor device that can be switched from an ON state to an OFF state such as a triac TR1 having cathode (C), anode (A) and gate (G) terminals. The triac TR1 is connected at the C terminal to the load 52 and at the A terminal to the AC source 50, thereby connecting the triac TR1 of the control switch in series with the load 52 and the AC source 50 of the electrical system 49. The gate terminal of the triac TR1 is connected to a first terminal 53a of a bridge rectifier circuit BR1 constructed of four rectifier diodes and the anode of the triac TR1 is connected to a second terminal 53c of the bridge rectifier circuit BR1. The bridge rectifier circuit BR1 converts alternating current flowing in the AC side, i.e. the side of the bridge rectifier circuit BR1 which includes the AC source 50, to a direct current flowing in the DC side, i.e. the circuitry on the side of the bridge rectifier circuit BR1 opposite to the AC source 50, thereby resulting in a positive voltage at terminal 53d. Finally, a terminal 53b of the bridge rectifier circuit BR1 is connected to ground.

On the DC side of the bridge rectifier circuit BR1, an N-channel MOSFET transistor T1 or similar device such as a bipolar transistor has a drain terminal D connected to terminal 53d, a gate terminal G and a source terminal S connected to ground. A capacitor C1 is connected between the gate terminal G of the transistor T1 and the terminal 53d. The first liquid detection probe 54 is connected to the gate terminal G of the transistor T1 and to a resistor R1. The other end of the resistor R1 is connected to ground. A second liquid detection probe 56 is also connected to ground. A first diode D1 is connected between the gate terminal G of the transistor T1 and ground to keep the gate terminal G of the transistor T1 from going negative and a second diode D2 is connected between the first liquid detection probe 54 and the gate terminal G of the transistor T1 to protect the gate terminal G of the transistor T1 from surges, static charges or other excessive voltages and currents which may contact the liquid detection probe 54, thereby providing protection for the load 24.

With no liquid contacting the liquid detection probes 54, 56, when a voltage is suddenly applied across the triac TR1, for example, from the AC source 50 during starting of the electrical system 49, the control switch 48 is turned ON. The capacitor C1 charges, thereby causing the transistor T1 to conduct current via the bridge circuit BR1 which, in turn, triggers the triac TR1 into conduction, thereby conducting current in the electrical system 49 such that electrical equipment included as part of the load 52 will operate. During such operation, the voltage drop across the triac TR1 will typically be less than 2.0 volts.

If, however, the positive charge at the gate terminal G of the transistor T1 is neutralized and/or replaced with a negative charge, for example, by providing a conductive path from the gate terminal G of the transistor T1 to ground, the transistor T1 is turned OFF, thereby turning the control switch 48 OFF. Thus, if liquid accumulating in the overflow pan 44 contacts the liquid detection probes 54, 56, a high resistance conductive path from the gate terminal G of the transistor T1 to ground via the low ionic strength liquid typically produced as condensate in an air refrigeration system will permit the voltage stored by the capacitor C1 to leak off, thereby switching the control switch 48 into the OFF state. Thus, by varying the value of the resistor R1, a first means for adjusting the sensitivity of the control switch 48 to the presence of water at the liquid detection probes 54, 56 is provided. The sensitivity of the control switch 48 may be modified, i.e. the sensitivity may be increased by decreasing the value of the resistor R1. Similarly, a second means for adjusting a second means for adjusting the sensitivity of the control switch 48 may also be provided. Here, the sensitivity of the control switch 48 may be increased by reducing the value of the capacitor C1. By increasing the sensitivity of the control switch 48 such that low ionic liquids such as those produced as condensate in an air refrigeration system may be readily detected, it is hereby contemplated that the control switch 48 will not be limited to the detection of liquids having a high ionic strength but shall also be able to satisfactorily detect the presence of low ionic liquids, for example, commercially available distilled water, rain water and certain other organic solutions of low ionic strength, with a pair of liquid detection probes of dimensions 0.1 inch length and 0.035 inch diameter spaced over 1.0 foot apart. This represents a significant improvement in the sensitivity of liquid detection probes to be utilized with low voltage supplied i.e. 0.8 to 1.4 volt, control switches.

When the positive charge at the gate terminal G of the transistor T1 has been removed, the resistor R1 will maintain a neutral or negative potential at the gate. As a result, when the conductive path from the gate terminal G of the transistor T1 to ground via the liquid contacting the liquid detection probes 54, 56 is removed, for example, by the removal of the liquid accumulated in the overflow pan 44, the resistor R1 will maintain a neutral or negative potential at the gate terminal G of the transistor T1, thereby preventing the control switch 48 from turning on. In such a manner, the control switch 48 switches into and locks in the OFF condition when the liquid detection probes 54, 56 detect an accumulation of liquid in the overflow pan 44 and will not return to the ON state when the accumulated liquid is removed. The control switch 48 is reset, i.e., returned to the ON state by permitting the charge across the capacitor C1 to completely neutralize followed by the reestablishment of current through the control switch 48, thus returning a positive charge to the gate terminal G of the transistor T1. For example, reconnecting the AC source 50 by providing a voltage surge across the control switch 48 or by allowing the neutral or negative charge at gate G of the transistor T1 to leak off followed by turning the power back ON.

Exemplary values for the components of the control switch 48 such that the control switch 48 shall operate as set forth above are as follows:

| Component | Value |
| --- | --- |
| TR1 | 1-6 a, 200-400 v; |
| BR1 | 50-100 PRV, 1-2 a; |
| T1 | 60-200 VDS, 0.4-5.0 RDS, 1-5 a; |
| R1 | 200K-22 Meg; |
| R2 | 500-50,000 ohms; |
| C1 | 10 pf-.1 mf; |
| D1 | 50-100 PRV; and |
| D2 | 50-100 PRV. |

Referring next to FIG. 4a, a second embodiment of the control switch 48 in which the normally ON control switch 48 switches to the OFF state when the liquid contacts the liquid detection probes 54, 46, and then resets, i.e. returns to the ON state, within a finite time period after the liquid no longer contacts the liquid detection probes 54, 56 shall now be described. In this embodiment, a diode D3 and a large resistor $R_x$ are connected in series between the positive terminal 53d of the bridge circuit BR1 and the gate terminal G of the transistor T1 to provide a leakage path for the capacitor C1. Accordingly, when the liquid no longer contacts the liquid detection probes 54, 56, the positive charge at the gate terminal G of the transistor T1 can be re-established, thereby causing the transistor T1 to conduct current via the bridge circuit BR1 which, in turn, triggers the triac TR1 into conducting current.

Figure 4B:
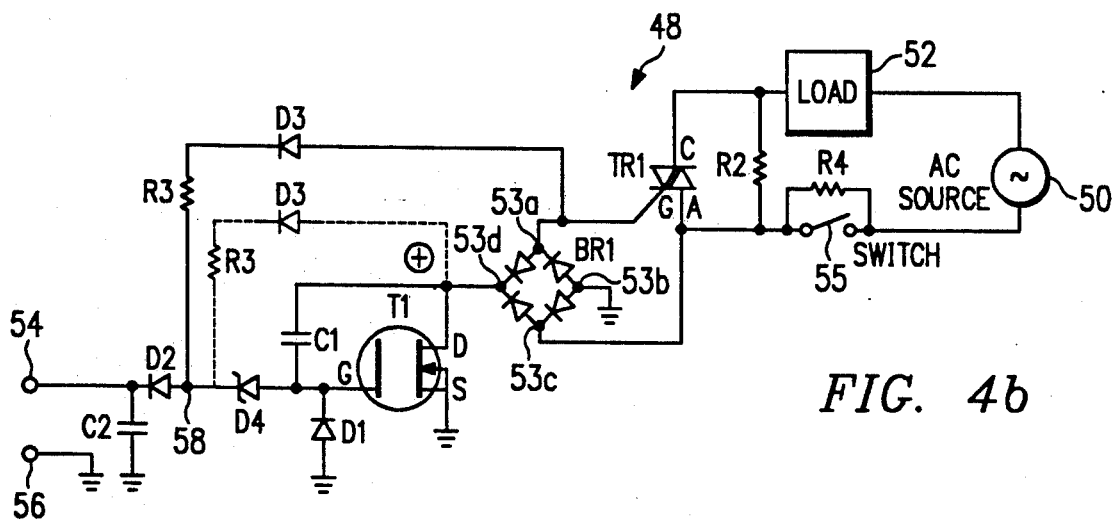
FIG. 4b is a schematic diagram of an alternate embodiment of the control switch of FIG. 4a which switches into the ON position when liquid detection probes associated therewith contact water and which resets after a time delay.

Referring next to FIG. 4b, an alternate embodiment of the control switch of FIG. 4a in which the normally ON control switch 48 switches to the OFF state when the liquid contacts the liquid detection probes 54, 56 and then, after the liquid no longer contacts the liquid detection probes 54, 56, the control switch 48 resets after a time delay, may be provided by replacing the resistor R1 with a capacitor C2 and by installing a zener diode D4, a resistor R3, and a diode D3 between the gate terminal G of the transistor T1 and the terminal 53a of the bridge circuit BR1. When the control switch 48 is in the ON state, a positive change across the capacitor C1 holds the gate terminal G of the transistor T1 positive. The capacitor C2 is similarly charged. When the liquid contacts the liquid detection probes 54, 56, a conductive path from the gate terminal G of the transistor T1 to ground is provided. Accordingly, the transistor T1 and the control switch 48 are turned OFF. When the liquid is removed from the liquid detection probes 54, 56, the capacitor C1 maintains a negative charge at the gate terminal G of the transistor T1, thereby keeping the control switch 48 in the OFF state while a charge begins to build on the capacitor C2. When the charge on the capacitor C2 is sufficient to overcome the zener breakdown voltage, a positive conductive charge is provided at the gate terminal G of the transistor T1, thereby turning the transistor T1 and the control switch 48 on. In an alternative embodiment, the diode D3 and the resistor R3 may be connected in series between the terminal 53d of the bridge circuit BR1 and the gate terminal G of the transistor T1 as shown in phantom in FIG. 4a to produce the same result. Finally, the time delay between removing the liquid from the liquid detection probes 54, 56 and the charging of the gate terminal G of the transistor T1 may be increased by increasing the value of the resistor R3 and the capacitor C2. An on/off control switch 55 may be connected between the load 52 and the AC source 50. When no liquid covers the liquid detection probes 54, 56 and when current first enters the control switch after all charges have leaked of the capacitor C1 and the capacitor C2, i.e. the circuit has been completely disconnected by the above-identified on/off switch 55 for a long time, the control switch 48 will go through the delay period before turning on. If this is undesirable, a minimal current such that the current is small enough to consider the load 24 off should be kept going through the control switch 48 and the load 52 at all times. This can be accomplished via a bypass resistor R4 in parallel with the on/off control switch 55.

Exemplary values for the components of the control switch 48 so that the control switch 48 shall operate as herein described are as follows:

| Component | Value |
| --- | --- |
| R3 | 4.7 meg; |
| D4 | 13.0 v zener, 500 mw; |
| C2 | 0.68 mf; and |
| C1 | 330 pf. |

Figure 5A:
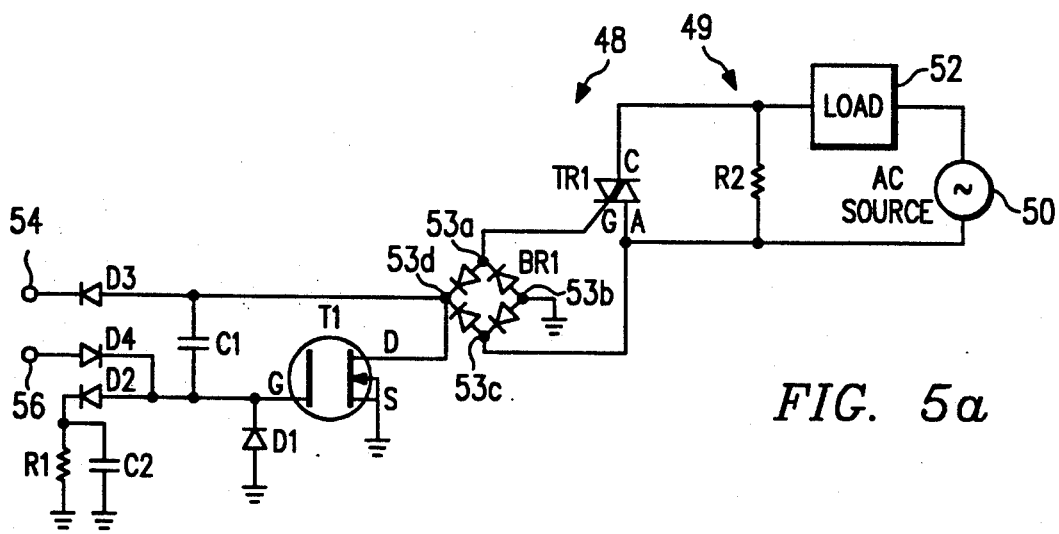
FIG. 5a is a schematic diagram of a third embodiment of the control switch of FIGS. 3a-b which switches into the locked ON position when liquid detection probes associated therewith contact water.

Referring next to FIG. 5a, a third embodiment of the control switch of FIGS. 3a-b in which the normally OFF control switch 48 will turn on when liquid contacts the liquid detecting probes 54, 56 and will remain on after the liquid has been removed from the liquid detecting probes 54, 56. To modify the control switch 48 of FIG. 3b to produce the control switch 48 of the present embodiment, a surge capacitor C2 is installed in parallel with the resistor R1. Also, the liquid detecting probe 54 is now connected to the terminal 53d of the bridge circuit BR1 for greater sensitivity and the liquid detecting probe 56 is now connected to the gate terminal G of the transistor T1. The diodes D3 and D4 are added to protect the control circuit 48 from surges, static charges or other excessive voltages and currents which may contact the liquid detecting probes 54, 56 and which may prove damaging to the control circuit 48. Alternately, a large resistor may be substituted for the diode D4 for the same purpose. When a voltage is suddenly applied across the triac TR1, for example, from the AC source 50 during starting of the electrical system 49, the capacitor C2 brings the gate G of the transistor T1 to ground and the transistor T1 will not conduct current via the bridge circuit BR1 and the control switch remains OFF. When liquid contacts the liquid detecting probes 54, 56, a positive charge is built at the gate G of the transistor T1, turning the transistor T1 on, where it is maintained by the capacitor C1. When the liquid is later removed from contact with the liquid detecting probes 54, 56, however, the positive condition remains at the gate G of the transistor T1. An alternate embodiment of the control switch 48 of FIG. 5a may be seen by reference to FIG. 5b. In this embodiment, the liquid detecting probe 54 is connected to the terminal 53a of the bridge circuit 54. Exemplary values for the components of the control switch 48 so that the control switch 48 shall operate as herein described are as follows:

| Component | Value |
| --- | --- |
| Resistor replacing D4 | 1.0 Meg; |
| C2 | .22 mf; and |
| C1 | .0022 mf. |

The stabilizing resistor R2 which is illustrated in FIG. 3 as connected between the anode terminal and the cathode terminal of the triac TR1 is required for this circuit but for a different reason. If the resistor R2 is not present, and if the control switch has no charges on either the capacitor C1 or the capacitor C2, i.e. the circuit has been without power for a long period, when the AC source 50 is first connected, a surge may cause the control switch 48 to momentarily turn on. The resistor R2 prevents this such that the control switch 48 is always OFF whenever power is either ON or OFF the circuit until such time as the liquid covers the liquid detection probes 54, 56, the occurrence of which, as previously noted, locks the control switch 48 ON.

Figure 5B:
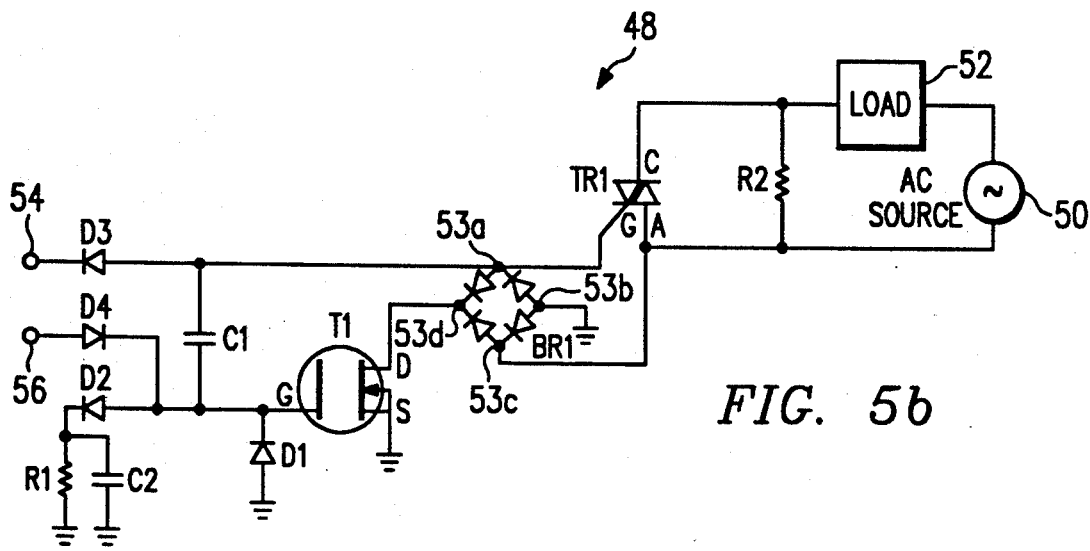
FIG. 5b is a schematic diagram of an alternate embodiment of the control switch of FIG. 5a which switches into the locked ON position when liquid detection probes associated therewith contact water.
Figure 6A:
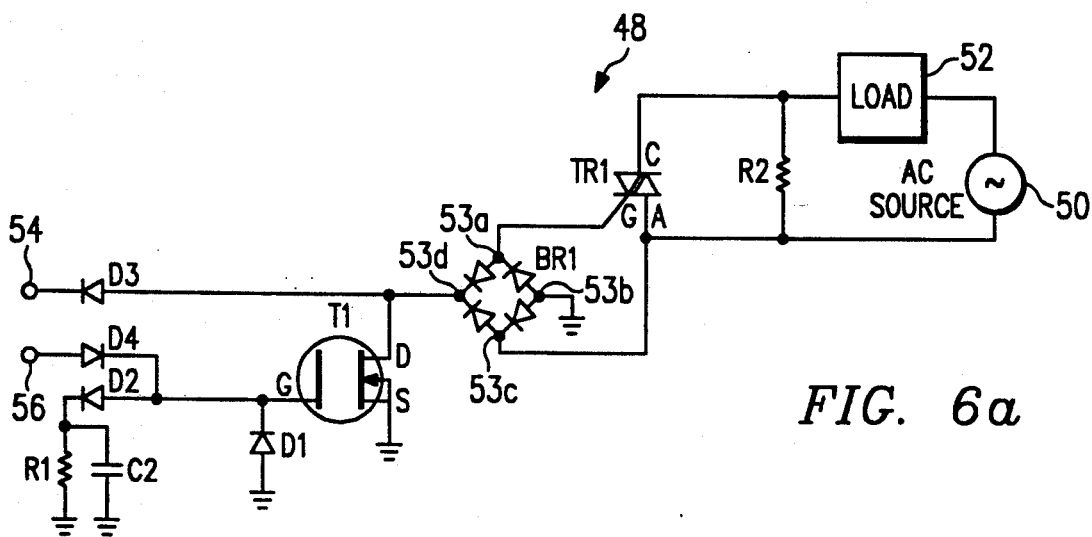
FIG. 6a is a schematic diagram of a fourth embodiment of the control switch of FIGS. 3a-b which switches into the ON position when liquid detection probes associated therewith contact water and which resets after a time delay.

Referring next to FIG. 6a, a second embodiment of the control switch of FIGS. 5a–b in which the control switch 48 which would reset immediately or in a finite period after liquid no longer contacts the liquid detection probes. In this embodiment the capacitor C1 has been removed and the value of the capacitor C2 has been reduced. The capacitor C2 protects the gate terminal G of the transistor T1 from in-rush current when current first enters the control switch 48, thereby preventing the control switch 48 from temporarily turning on. An alternate embodiment of the control switch 48 of FIG. 6a may be seen by reference to FIG. 6b. Here, the first liquid detecting probe 54 is connected to the terminal 53a of the bridge circuit BR1.

Figure 6B:
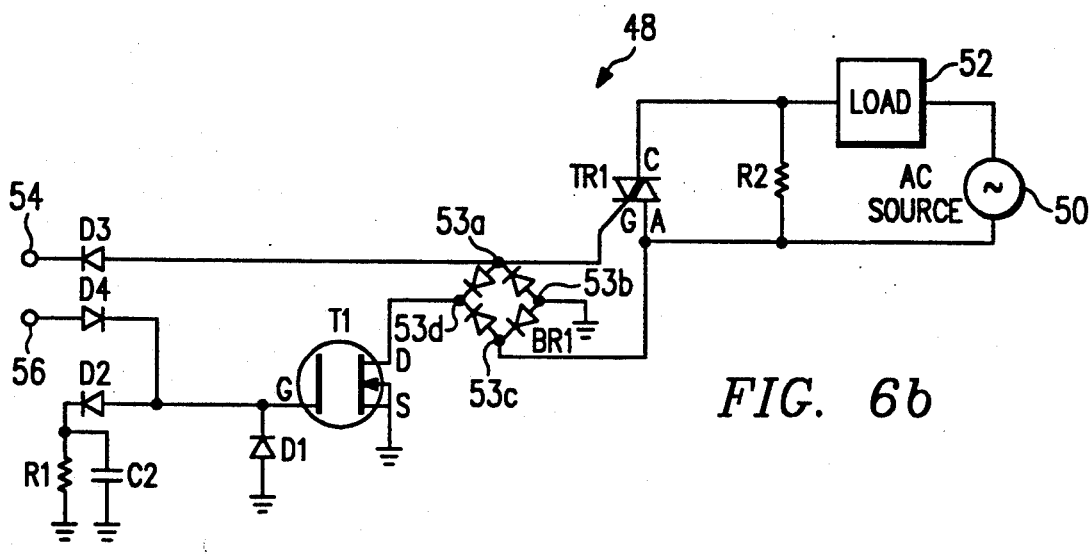
FIG. 6b is a schematic diagram of an alternate embodiment of the control switch of FIG. 6a which switches into the ON position when liquid detection probes associated therewith contact water and which resets after a time delay.
Figure 6C:
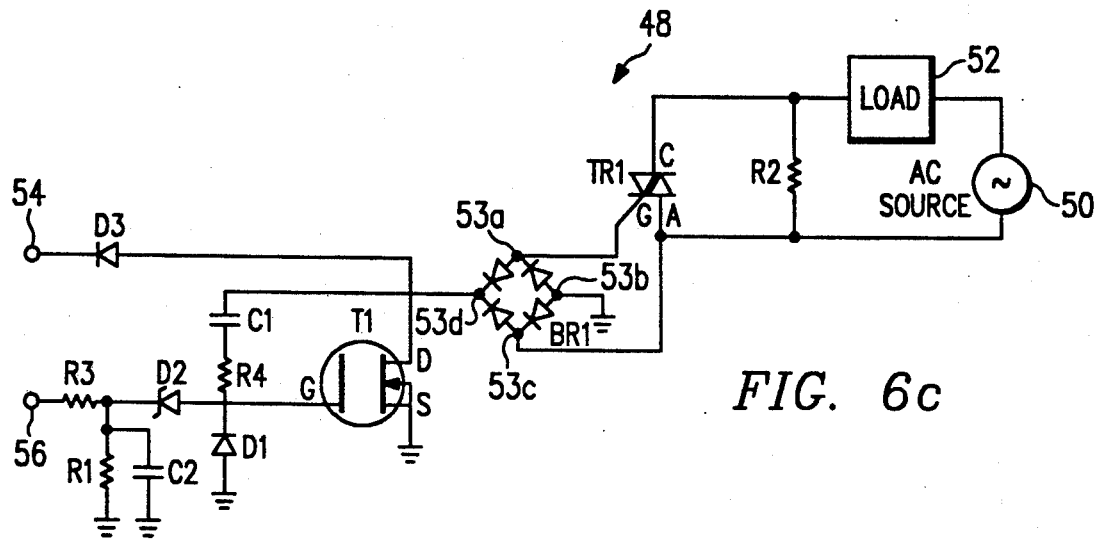
FIG. 6c is a schematic diagram of still another alternate embodiment of the control switch of FIG. 6a and which switches into the ON position when liquid detection probes associated therewith contact water and which resets after a time delay.
Figure 6D:
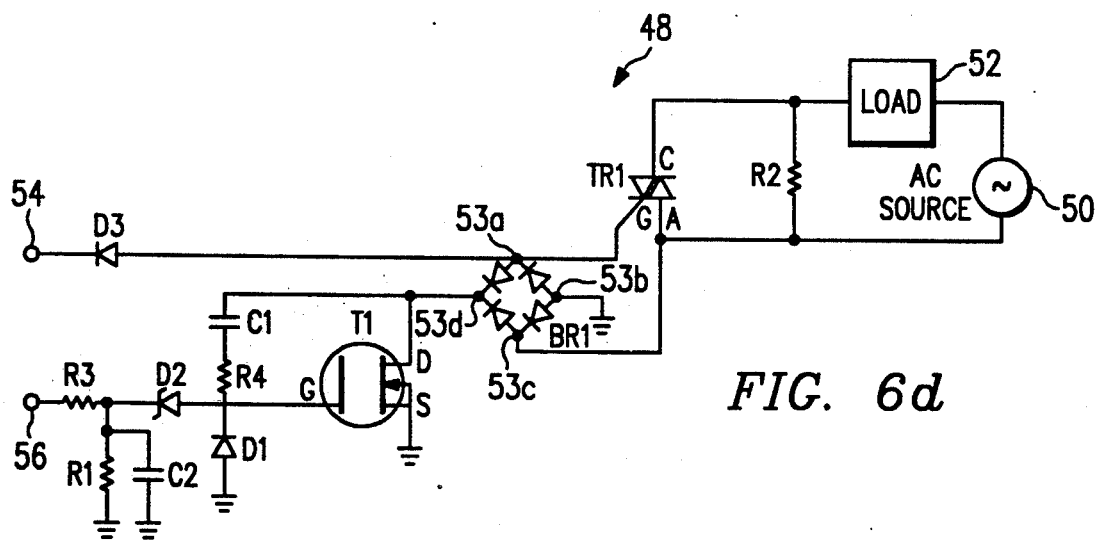
FIG. 6d is a schematic diagram of still yet another alternate embodiment of the control switch of FIG. 6a which switches into the ON position when liquid detection probes associated therewith contact water and which resets after a time delay.

Finally, referring now to FIG. 6c, yet another alternate embodiment of the control switch 48 illustrated in FIGS. 6a–b. In this embodiment, the control switch 48 is modified such that a delay is provided before the control switch turns on. By doing so, undue chatter or oscillations on the load will be prevented even if the liquid level is oscillating. In this embodiment, the diode D2 is a zener diode and a capacitor C1 and a resistor R4 are connected in series between the gate terminal G of the transistor T1 and the terminal 53d of the bridge circuit BR1. When voltage is first applied to the circuit, the control switch 48 is initially off because the surge capacitor C2 and the resistor R1 bring the gate G of the transistor T1 low. When fluid contacts the probes, a positive voltage from the diode D3 causes current to flow through the fluid and through the resistor R3, thereby producing a positive charge on the capacitor C2. As the voltage on the surge capacitor C2 builds up, it will eventually exceed the zener breakdown voltage of the diode D2, and a positive charge will then develop on the capacitor C1 and the transistor T1 turns on, thereby turning the control switch 48 on. The time period for the capacitor C2 to build the charge necessary to overcome the zener breakdown voltage is the time delay period before the control switch 48 turns on. This period increases with an increase in the value of the resistor R3 and the surge capacitor C2. In an alternate embodiment illustrated in FIG. 6d, the liquid detector probe 54 is connected to the gate G of the triac TR1. As before, a diode D3 is provided between the liquid detector probe 54 and the connecting terminal to protect the control switch from surges, static charges or other excessive voltages and currents which may contact the liquid detecting probes 54, 56 and which could possibly be damaging to the control circuit 48. In this embodiment, the capacitor C1 and the resistor R4 stabilize the control circuit in the on position when liquid contacts the liquid detecting probes 54, 56. After liquid covers the liquid detecting probes 54, 56 and the control switch 48 is turned on, the capacitor C2 begins to discharge through the resistor R1.

Exemplary values for the components of the control switch 48 so that the control switch 48 shall operate as herein described are as follows:

| Component | Value |
| --- | --- |
| R3 | 1.0 Meg; |
| C2 | 0.68 mf; |
| R1 | 4.7 Meg; |
| C1 | 330 pf; |
| R4 | 1.0 Meg; and |
| D2 | 13.0 v zener diode, 500 mw. |

All of the various embodiments of the present invention which have been discussed herein have utilized an AC source 50 as the current supply for the circuit. It should be clearly noted, however, that the circuits described herein will also operate with an unfiltered DC source but will not operate with a filtered DC source.

Thus, there has been described and illustrated herein various embodiments of a control switch for controlling an associated electrical system such as an air refrigeration system. However, those skilled in thea rt will recognize that many modifications and variations besides those specifically mentioned besides those specifically mentioned may be made in the techniques described herein without departing substantially form the concept of the present invention. Accordingly, it should be clearly understood that the form of the invention described herein is exemplary only and is not intended as a limitation on the scope of the invention. d

What is claimed is:

1. A control switch apparatus for controlling the operation of an electrical system based upon the accumulation of liquid at a designated location in said electrical system, comprising:
- a control switch in series with the electrical system;
- a first liquid detecting probe positioned at said designated location;
- a second liquid detecting probe positioned at said designated location;
- means for connecting said electrical system by placing a positive conductive charge on said control switch;
- means for disconnecting said electrical system upon the detection of accumulated liquid at said designated location by said first and second probes, said disconnecting means comprising a control switch discharge path for discharging said positive conductive charge when said first and second probes contact said accumulated liquid;
- means for resetting said control switch, said resetting means reapplying a positive conductive charge on said control switch; and
- means for maintaining the disconnection of said electrical system after said first and second probes no longer detect accumulated liquid at said designated location, and before said control switch is reset, said means for maintaining disconnection maintaining a negative or neutral conductive charge on said control switch, said negative or neutral conductive charge preventing said control switch from turning on.

2. An apparatus according to claim 1 whereby sensitivity to said accumulated liquid may be adjusted by varying a resistance to the discharge of said conductive charge.

3. An apparatus according to claim 2 whereby sensitivity to said accumulated liquid may be adjusted by varying said conductive charge of said control switch.

4. An apparatus according to claim 3 and further comprising:
- an electrical load in said electrical system, said electrical load including a load relay; and
- said control switch reducing current through said electrical system to a level insufficient to engage said load relay.

5. An apparatus according to claim 4 wherein said positive charge is placed on and maintained on said control switch by said electrical system connection means until said electrical system is disconnected by said electrical system disconnection means.

6. An apparatus according to claim 5 and further comprising means for protecting said control switch from electrical surges originating at said first liquid detecting probe.

7. For an electrical system which includes an alternating current source and a load connected in series with each other, a control switch for controlling the operation of said electrical system based upon the accumulation of liquid at a designated location in said electrical system, comprising:
- a first liquid detecting probe positioned at said designated location;
- a second liquid detecting probe positioned at said designated location, said second liquid detecting probe connected to ground;
- a transistor having a gate junction connected to said first liquid detecting probe, a drain junction, and a source junction connected to ground;
- a bridge rectifier circuit having a first terminal, a second terminal connected to ground, a third terminal, and a fourth terminal connected to said drain junction of said transistor, said bridge rectifier circuit converting alternating current from said electrical system to direct current for said control switch, thereby providing a positive voltage at said fourth terminal of said bridge rectifier circuit;
- a three junction, bi-stable semiconductor device, said first junction connected to said first terminal of said bridge rectifier circuit, said second junction connected to said electrical system load and said third junction connected to said electrical system AC source and said third terminal of said bridge rectifier circuit;
- a first capacitor connected between said fourth terminal of said bridge rectifier circuit and said gate junction of said transistor, said first capacitor being charged by the operation of said electrical system and maintaining a positive voltage at said gate junction of said transistor during operation of said electrical system, said control switch and said electrical system thereby being maintained in an on state;
- wherein the presence of liquid between said first and second liquid detecting probes provides a path to ground for said charge on said first capacitor, thereby removing said positive voltage at said gate junction of said transistor and turning said control switch and said electrical system into an off state; and
- a first resistor connected between said first liquid detecting probe and ground, said first resistor maintaining the absence of said positive charge at said gate junction, thereby keeping said control switch and said electrical system in said off state after said path to ground has been removed.

8. An apparatus according to claim 7 wherein said electrical system further comprises:
- a temperature activated relay; and
- a second resistor connected between said second and third junctions of said bi-stable semiconductor device, said second resistor sized to prevent said electrical system from switching into said on state until said temperature activated relay has closed.

9. An apparatus according to claim 7 wherein said electrical system further comprises:
- a temperature activated relay and a surge resistor connected in parallel with said temperature activated relay; and
- a second resistor connected between said second and third junctions of said bi-stable semiconductor device, said second resistor sized to prevent said electrical system from switching into said on state until said temperature activated relay has closed, said second resistor further preventing said surge resistor from causing leakage of said positive voltage from said gate junction of said transistor.

10. An apparatus according to claim 7 and further comprising a control switch impedance connected between said third junction of said bi-stable semiconductor device and true ground.

11. An apparatus according to claim 7 and further comprising a first diode connected between said gate function of said transistor and ground, said first diode keeping the voltage at said gate junction from going excessively negative.

12. An apparatus according to claim 7 and further comprising a second diode connected between said first liquid detecting probe and said gate junction of said transistor, said second diode protecting said control switch from electrical surges originating at said first liquid detecting probe.

13. An apparatus according to claim 12 wherein said bi-stable semiconductor device having first, second and third junctions is a triac having gate, cathode and anode terminals.

14. An apparatus according to claim 7 and further comprising means for providing a leakage path for said first capacitor, said leakage path permitting the reestablishment of said positive voltage at said gate function of said transistor, thereby providing a turn-on of said control switch and said associated electrical system into said on state after liquid is removed from between said probes.

15. An apparatus according to claim 14 wherein said means for providing a leakage path for said first capacitor further comprises:
a first diode; and
a second resistor, said first diode connected between said fourth terminal of said bridge rectifier circuit and said second resistor, said second resistor connected between said first diode and said gate junction of said transistor.

16. An apparatus according to claim 14 wherein said electrical system further comprises:
a temperature activated relay; and
a second resistor connected between said second and third junctions of said bi-stable semiconductor device, said second resistor sized to prevent said electrical system from switching into said on state until said temperature activated relay has closed.

17. An apparatus according to claim 14 wherein said electrical system further comprises:
a temperature activated relay and a surge resistor connected in parallel with said temperature activated relay; and
a second resistor connected between said second and third junctions of said bi-stable semiconductor device, said second resistor sized to prevent said electrical system from switching into said on state until said temperature activated relay has closed, said second resistor further preventing said surge resistor from causing leakage of said positive voltage from said gate junction of said transistor.

18. An apparatus according to claim 14 and further comprising a control switch impedance connected between said third junction of said bi-stable semiconductor device and true ground.

19. An apparatus according to claim 19 and further comprising a second diode connected between said gate junction of said transistor and ground, said second diode keeping the voltage at said gate junction from going excessively negative.

20. An apparatus according to claim 19 and further comprising a third diode connected between said first liquid detecting probe and said gate junction of said transistor, said third diode protecting said control switch from electrical surges originating at said first liquid detecting probe.

21. For an electrical system which includes an alternating current source and a load connected in series with each other, a control switch for controlling the operation of said electrical system based upon the accumulation of liquid at a designated location in said electrical system, comprising:
a first liquid detecting probe positioned at said designated location;
a second liquid detecting probe positioned at said designated location, said second liquid detecting probe connected to ground;
a transistor having a gate junction connected to said first liquid detecting probe, a drain junction and a source junction connected to ground;
a bridge rectifier circuit having a first terminal, a second terminal connected to ground, a third terminal and a fourth terminal connected to said drain junction of said transistor and said first liquid detecting probe, said bridge rectifier circuit converting alternating current from said electrical system to direct current for said control switch, thereby providing a positive voltage at said fourth terminal of said bridge rectifier circuit;
a three junction, bi-stable semiconductor device, said first junction connected to said first terminal of said bridge rectifier circuit, said second junction connected to said electrical system load and said third junction connected to said electrical system AC source and said third terminal of said bridge rectifier circuit;
a first capacitor connected between said fourth terminal of said bridge rectifier circuit and said gate junction of said transistor, said first capacitor being charged by the operation of said electrical system and maintaining a positive voltage at said gate junction of said transistor during operation of said electrical system, said control switch and said electrical system thereby being maintained in an on state;
wherein the presence of liquid between said first and second liquid detecting probes provides a path to ground for said charge on said first capacitor, thereby removing said positive voltage at said gate function of said transistor and turning said control switch and said electrical system into an off state; and
means for providing a time delay after the removal of said liquid between said first and second liquid detecting probes and the reestablishment of said positive voltage at said gate junction of said transistor, said means for providing a time delay after the removal of said liquid between said first and second liquid detecting probes and the reestablishment of said positive voltage at said gate junction of said transistor further comprising a second capacitor connected between said first liquid detecting probe and ground; and a zener diode connected between said second capacitor and said gate junction of said transistor; said second capacitor charging upon removal of said liquid between said first and second liquid detecting probes, said second capacitor reestablishing said positive voltage at said gate junction upon the charge of said second capacitor exceeding the breakdown voltage of said zener diode.

22. An apparatus according to claim 21 wherein said electrical system further comprises:
a temperature activated realy; and
a second resistor connected between said second and third junctions of said bi-stable semiconductor device, said second resistor sized to prevent said electrical system from switching into said on state until said temperature activated relay has closed.

23. An apparatus according to claim 21 said electrical system further comprises:
  a temperature activated relay and a surge resistor connected in parallel with said temperature activated relay; and
  a second resistor connected between said second and third junctions of said bi-stable semiconductor device, said second resistor sized to prevent said electrical system from switching into said on state until said temperature activated relay has closed, said second resistor further preventing said surge resistor from causing leakage of said positive voltage from said gate junction of said transistor.

24. An apparatus according to claim 21 and further comprising a control switch impedance connected between said third junction of said bi-stable semiconductor device and true ground.

25. For an electrical system which includes an alternating current source and a load connected in series with each other, a control switch for controlling the operation of said electrical system based upon the accumulation of liquid at a designated location in said electrical system, comprising:
  a first liquid detecting probe positioned at said designated location;
  a second liquid detecting probe positioned at said designated location;
  a transistor having a gate junction, a drain junction, and a source junction connected to ground, said second liquid detecting probe connected to said gate junction of said transistor;
  a bridge rectifier circuit having a first terminal, a second terminal connected to ground, a third terminal, and a fourth terminal connected to said drain junction of said transistor and said first liquid detecting probe, said first liquid detecting probe connected to said fourth terminal of said bridge rectifier circuit;
  a three junction, bi-stable semiconductor device, said first junction connected to said first terminal of said bridge rectifier circuit, said second junction connected to said electrical system load and said third junction connected to said electrical system AC source and said third terminal of said bridge rectifier circuit;
  a first capacitor connected between said fourth terminal of said bridge rectifier circuit and said gate junction of said transistor;
  a first resistor connected between said gate junction of said transistor and ground; and
  a surge capacitor connected in parallel with said first resistor;
  wherein the presence of liquid between said first and second liquid detecting probes builds a positive charge at said gate junction of said transistor, thereby turning said control switch into an on state, and wherein said first capacitor maintains said positive charge at said gate junction of said transistor, thereby locking said control switch in said on state.

26. An apparatus according to claim 25 wherein said electrical system further includes a temperature activated relay and wherein said apparatus further comprises a second resistor connected between said second and third junctions of said bi-stable semiconductor device, said second resistor keeping said electrical system in said off state until liquid is present between said first and second liquid detecting probes.

27. An apparatus according to claim 25 and further comprising a control switch impedance connected between said third junction of said bi-stable semiconductor device and true ground.

28. An apparatus according to claim 25 and further comprising a first diode connected between said gate junction of said transistor and ground, said first diode keeping the voltage at said gate junction from going excessively negative.

29. An apparatus according to claim 28 and further comprising a second diode connected between said second liquid detecting probe and said gate junction of said transistor, said second diode protecting said control switch from electrical surges originating at said second liquid detecting probe.

30. For an electrical system which includes an alternating current source and a load connected in series with each other, a control switch for controlling the operation of said electrical system based upon the accumulation of liquid at a designated location in said electrical system, comprising:
  a first liquid detecting probe positioned at said designated location;
  a second liquid detecting probe positioned at said designated location;
  a transistor having a gate junction, a drain junction, and a source junction connected to ground, said second liquid detecting probe connected to said gate junction of said transistor;
  a bridge rectifier circuit having a first terminal, a second terminal connected to ground, a third terminal, and a fourth terminal connected to said drain junction of said transistor and said first liquid detecting probe, said first liquid detecting probe connected to said fourth terminal of said bridge rectifier circuit;
  a three junction, bi-stable semiconductor device, said first junction connected to said first terminal of said bridge rectifier circuit, said second junction connected to said electrical system load and said third junction connected to said electrical system AC source and said third terminal of said bridge rectifier circuit;
  a first resistor connected between said gate junction of said transistor and ground; and
  a surge capacitor connected in parallel with said first resistor;
  wherein the presence of liquid between said first and second liquid detecting probes builds a positive charge at said gate junction of said transistor, thereby turning said control switch into an on state; and
  means for removing said positive charge at said gate terminal, thereby immediately turning said control switch into an off state, when the liquid between said first and second liquid detecting probes is removed, said means for removing said positive charge at said gate terminal comprising a first diode connected between said gate terminal of said transistor and said first resistor.

31. An apparatus according to claim 30 wherein said electrical system further includes a temperature activated relay and wherein said apparatus further comprises a second resistor connected between said second and third junctions of said bi-stable semiconductor device, said second resistor keeping said electrical system in said off state until liquid is present between said first and second liquid detecting probes.

32. An apparatus according to claim 30 and further comprising a control switch impedance connected between said third junction of said bi-stable semiconductor device and true ground.

33. An apparatus according to claim 30 and further comprising a second diode connected between said gate junction of said transistor and ground, said second diode keeping the voltage at said gate junction from going excessively negative.

34. An apparatus according to claim 33 and further comprising a third diode connected between said second liquid detecting probe and said gate junction of said transistor, said third diode protecting said control switch from electrical surges originating at said second liquid detecting probe.

35. For an electrical system which includes an alternating current source and a load connected in series with each other, a control switch for controlling the operation of said electrical system based upon the accumulation of liquid at a designated location in said electrical system, comprising:

a first liquid detecting probe positioned at said designated location;

a second liquid detecting probe positioned at said designated location;

a transistor having a gate junction, a drain junction, and a source junction connected to ground, said second liquid detecting probe connected to said gate junction of said transistor;

a bridge rectifier circuit having a first terminal, a second terminal connected to ground, a third terminal, and a fourth terminal connected to said drain junction of said transistor and said first liquid detecting probe, said first liquid detecting probe connected to said fourth terminal of said bridge rectifier circuit;

a three junction, bi-stable semiconductor device, said first junction connected to said first terminal of said bridge rectifier circuit, said second junction connected to said electrical system load and said third junction connected to said electrical system AC source and said third terminal of said bridge rectifier circuit;

a first capacitor connected between said fourth terminal of said bridge rectifier circuit and said gate junction of said transistor;

a first resistor connected between said gate junction of said transistor and ground;

a surge capacitor connected in parallel with said first resistor, said surge capacitor and said first resistor stabilizing said control switch in said on state and delaying the turning off of said control switch after the removal of said liquid between said first and second liquid detecting probes by maintaining a positive voltage at said gate junction of said transistor until said surge capacitor bleeds off through said first resistor; and means for delaying the turning on of said control switch after the detection of liquid between said first and second liquid detecting probes said means for delaying the turning on comprising said surge capacitor connected in series with a zener diode and said gate junction of said transistor, wherein said surge capacitor begins to charge upon presence of said liquid between said first and second liquid detecting probes, said surge capacitor establishing said positive voltage at said gate junction of said transistor upon the charge of said surge capacitor exceeding the breakdown voltage of said zener diode.

36. An apparatus according to claim 35 wherein said electrical system further comprises:

a temperature activated relay; and a second resistor connected between said second and third junctions of said bi-stable semiconductor device, said second resistor sized to prevent said electrical system from switching into said on state until said temperature activated relay has closed.

37. An apparatus according to claim 35 and further comprising a control switch impedance connected between said third junction of said bi-stable semiconductor device and true ground.

38. An apparatus according to claim 35 and further comprising a second diode connected between said gate junction of said transistor and ground, said second diode keeping the voltage at said gate junction from going excessively negative.

39. An apparatus according to claim 35 and further comprising a third diode connected between said first liquid detecting probe and said gate junction of said transistor, said third diode protecting said control switch from electrical surges originating at said first liquid detecting probe. t

* * * * *

UNITED STATES PATENT AND TRADEMARK OFFICE
CERTIFICATE OF CORRECTION

PATENT NO. : 5,196,729
DATED : March 23, 1993
INVENTOR(S) : John T. Thorngren

It is certified that error appears in the above-identified patent and that said Letters Patent is hereby corrected as shown below:

| | |
|---|---|
| Column 4, line 53 | After --an-- delete "t" |
| Column 8, line 39 | Delete "of" <br> Insert --off-- |
| Column 10, line 68 | After --invention.-- delete "d" |
| Column 12, line 66 | Delete "function" <br> Insert --junction-- |
| Column 14, line 40 | Delete "function" <br> Insert --junction-- |
| Column 18, line 48 | After --probe.-- Delete "t" |

Signed and Sealed this

Eighth Day of February, 1994

Attest:

BRUCE LEHMAN

*Attesting Officer*  *Commissioner of Patents and Trademarks*